TIME MULTIPLEX TELEPHONE SYSTEM

Filed Aug. 17, 1964 6 Sheets-Sheet 1

Jan. 30, 1968 A. DARRE ET AL 3,366,743

TIME MULTIPLEX TELEPHONE SYSTEM

Filed Aug. 17, 1964 6 Sheets-Sheet 3

TIME MULTIPLEX TELEPHONE SYSTEM

Filed Aug. 17, 1964 6 Sheets-Sheet 6

3,366,743
TIME MULTIPLEX TELEPHONE SYSTEM

Allan Darre, Munich, Otto Kneisel, Gauting, and Horst Honold, Munich, Germany, assignors to Siemens Aktiengesellschaft, Munich, Germany Filed Aug. 17, 1964, Ser. No. 390,143
Claims priority, application Germany, Aug. 20, 1963, S 86,809
11 Claims. (Cl. 179—18)

ABSTRACT OF THE DISCLOSURE

This application concerns a time multiplex telephone system in which the calling and called connection stations are connected together in an assigned pulse phase by actuation of speaking switches connected between the stations and the multiplex path. Actuation of the switches is controlled by switch addresses circulating in storage devices at the assigned pulse phase, but such actuation is completed by pulses circulating in the same phase in control storage devices. Consequently, if a connection is to be retained or held, while one of the stations is to be excluded from the connection, this result can be achieved by cancellation of the pulse of the phase assigned to the connection, in the control storage device associated with the station to be excluded from the connection. The application further contains disclosure of the logic circuitry of the central control apparatus by which reconfirmation and switching calls can be effected.

The invention concerns a circuit arrangement for an exchange system operating in accordance with the time multiplex principle, and in particular a secondary exchange system. In the operation under this principle, the control of the connections occurs through time-spaced pulses. The invention more specifically concerns a system in which a station participating in an existing connection is capable of making a new connection to a different station not participatig in the original connection.

In an exchange system operating in accordance with the time multiplex principle, the pulse phases are either assigned individually to the connection points, or the phases are assigned to the connections made. In the latter case, a connection is made between a calling station and a called station by way of a speaking multiplex point or path, such connecting being accomplished by operation of switches controlled in the pulse phase assigned to the connection. A speaking switch is asigned to each station participating in a connection and is operative to switch that station to the multiplex point. The operaion of the switch by the pulse phase assigned to the connection path is itself accomplished by means of a circultion storage device for calling stations or called stations, through a decoder connected to the storage device. For example, a pulse is transmitted from the circulation storage device for calling stations by way of the decoder to the corresponding switch with the pulse phase assigned to the connection path.

The object of the invention is to make it possible in simple fashion for a station participating in an existing connection, in an exchange system operating in accordance with the time multiplex principle, to form a connection with a third station not in the original connection, this operation being made possible with the pulse phases assigned to the connections made and under the control of the special signal emitted by the connection station desiring the alternative connection.

In accordance with the invention, the object is achieved by transmittal to a central control apparatus of the identifications of the existing connection path between two stations and by transmittal of a signal provided by the station desiring the alternative connection (for instance, a reconfirmation signal) in the pulse phase assigned to the existing connection. The control apparatus evaluates the signals transmitted to it and emits command signals with a new free pulse phase for the production of a new connection. Switches are activated in this new phase to cause transmission to the circulation storage devices (for either calling or called stations, as the case may be) to identify the station emitting the signal. This transmitted signal is provided with the newly assigned pulse phase and is operative to prepare the new connection.

In accordance with the invention, it is possible to form the new connection requested by a station participating in an existing connection with a new or second pulse phase, through use of apparatus already available in a time multiplex installation. In other words, this is possible since the original connection exists under the control of a first pulse phase and the newly formed connection exists under the control of a second newly seized pulse phase.

In accordance with a further development of the invention, when the new connection is in operation and the station which originally requested the new connection emits a further signal, that signal, together with the identification of the stations participating in the new connection, are transmitted to the central control apparatus and evaluated therein. The switching means of the central control apparatus then provides command signals which cancel the signals assigned to the connection with the third station and provide an impulse for an auxiliary storage device which controls the switch-through of the station which was eliminated from the new connection but which participated in the original connection. A special signal is then emitted with the original calling phase so that the renewed switching of this station to the speaking multiplex point is initiated with the phase which was originally assigned to the first connection made.

In such fashion it is possible, with a telephone exchange installation operating in accordance with the time multiplex principle, after emission of a first special signal by a station during an existing connection and the forming of a new connection with a third station (such as a reconfirmation connection), to allow the same station to permit a second special signal to cause the original connection to be reformed with the pulse phase assigned originally to that connection, this occurring by utilization of a central control apparatus already available in such a time multiplex exchange installation.

In accordance with a further development of the invention, and in dependence on the identification of the reconfirming station participating in an existing reconfirmation connection, such identification being stored in a circulation storage device, and further in dependence on a special signal given by the reconfirmed station, together with the existing reconfirmation connection, control signals are transmitted to the central control apparatus and evaluated therein. As a result, the control apparatus operates switching devices which emit command signals to identify the pulse phase assigned to the original connection in a special auxiliary storage device.

In such fashion it is possible to ascertain in simple manner, the pulse phase assigned to the original connection in an exchange system operating in accordance with the time multiplex principle, and while the system is in an existing reconfirmation connection having a special reconfirmation phase.

In accordance with a further development of the invention, it is possible for the reconfirmed speaking station to be connected with the connection station participating in the original connection but not in the reconfirmation connection in the pulse phase assigned to the reconfirmation already available in a time multiplex exchange system.

This connection can be achieved in the pulse phase assigned to the original connection.

In accordance with a further development of the invention, the reconfirmed speaking station may be connected together with the station participating in the original connection, but not in the reconfirmation connection in the pulse phase assigned to the reconfirmation connection as opposed to the original connection, this connection as well as the last referred-to connection being by way of the speaking multiplex point.

The drawings show an operative embodiment of the invention in the detail necessary for its understanding. The operative embodiment is a system designed so that signal transmission, that is the control as well as the coupling together of conductors, through multiplex speaking lines occurs in accordance with the time multiplex principle. However, the coupling together of the speaking conductors need not be by the time multiplex system but may be acomplished through a spatially-separated contact system as is conventional. It will be further appreciated that the central control apparatus can be considerably different than will be discussed herein.

Indeed, in the operative embodiment described herein, the method of operation of the central control apparatus will be detailed only to the extent necessary for the explanation of the object of the invention. It will be understood that the control processes can occur either by the alignment of the corresponding addresses or identifications at the output of the signal generator to be described in such fashion that the switching processes necessary for a reconfirmation occur in different stages or cycles, that is periodically. In other words, there may be an operation cycle following an information cycle, with the period of the information cycle being for instance 100 milliseconds, and with the switching processes occurring during the operation cycle at the time the appropriate address or identification is lined up at the output of the signal generator with the corresponding pulse phase.

On the other hand, the central control apparatus can be arranged to perform the switching processes for such as reconfirmation in stages in such fashion that a change of condition such as reconfirmation occurs only in dependence upon the signal generator and not the phase cycle, such changes occurring immediately following each other.

Turning now to the drawings.

Figure 3:
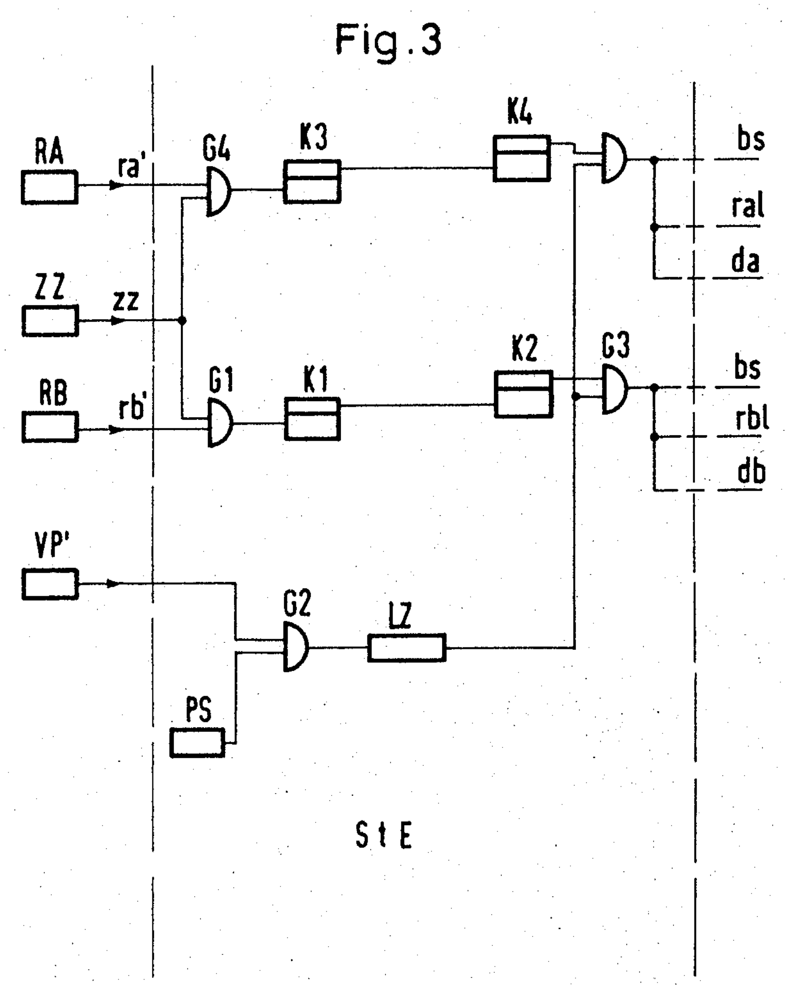
FIGS. 3 and 4 show the retracing of an original connection provided for by control of the reconfirming station.
Figure 4:
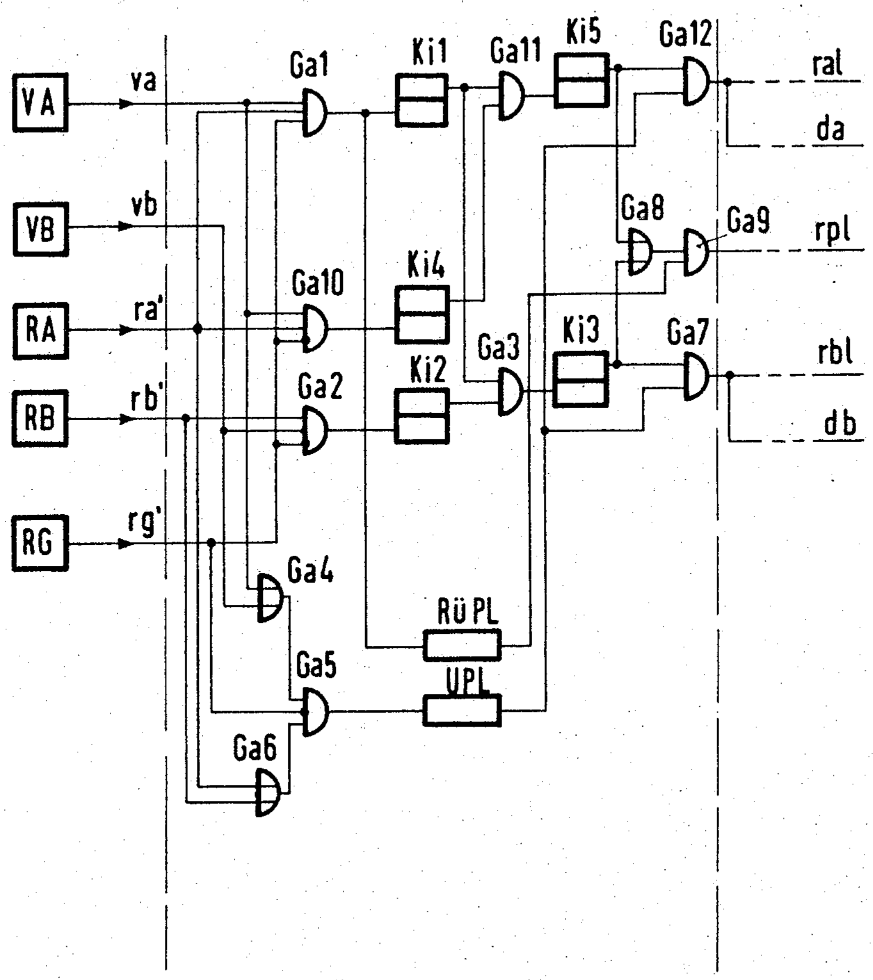

Preliminarily, it may be stated that FIGS. 3 and 4 show which control signals are transmitted to the central control apparatus and which command signals are emitted from the central control apparatus for the switching functions performed.

FIGS. 5–8 perform a similar function with respect to the exchange office connections.

Figure 2:
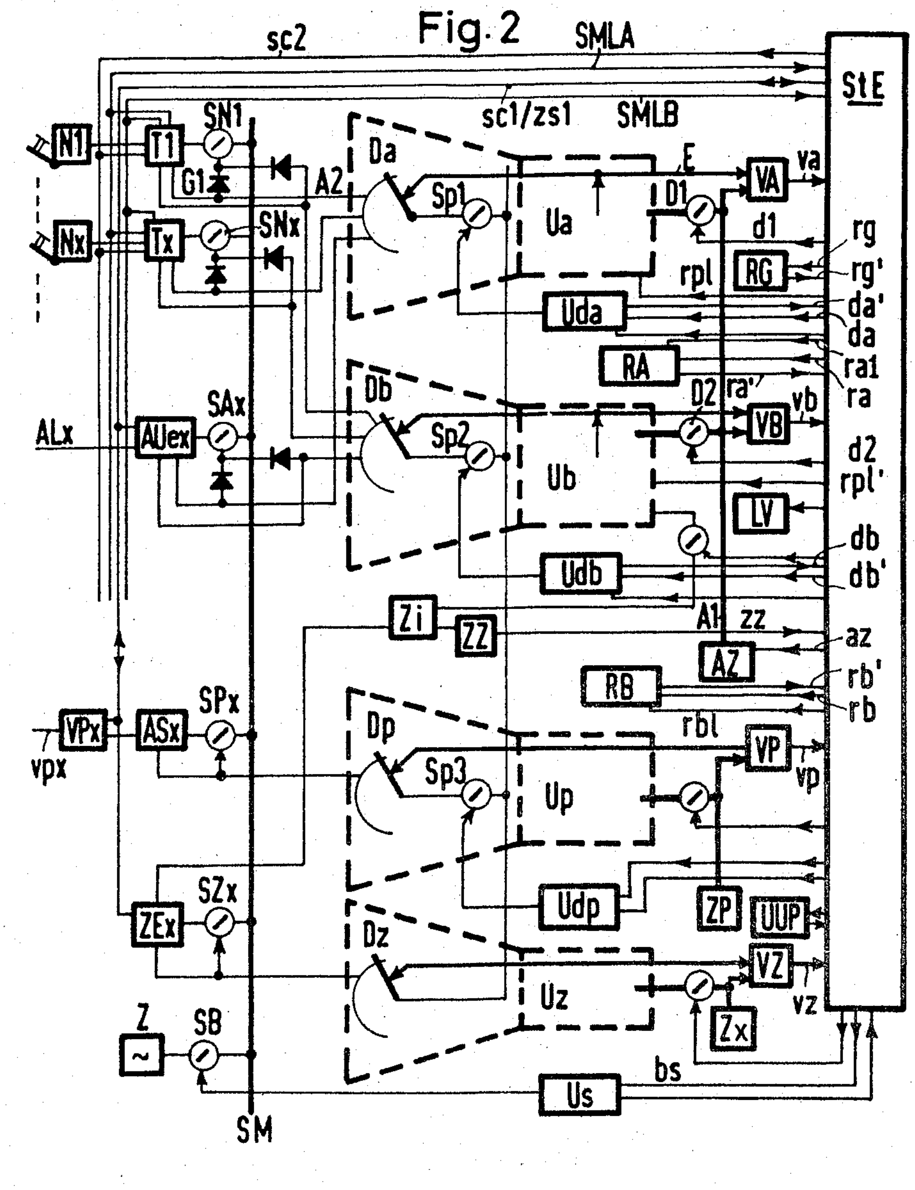
FIG. 2 is a general view of the telephone installation (particularly a secondary telephone installation) designed to operate in accordance with the time multiplex system.

The system shown in FIGS. 3–8 are parts of the complete system shown in FIG. 2 and provide signals which are identified both in FIG. 2 and in FIGS. 3–8, over appropriately identified conductors. In such fashion it is possible by examining both FIG. 2 and the appropriate ones of FIGS. 3–8, to determine which arrangement of the time multiplex system supplies the corresponding signals.

In order that the time multiplex system used for the arrangement to be described herein may be better understood, the relationship between the cycles and the pulse phases will be explained with the aid of FIG. 1. The signal generator, such as counting apparatus or ring generator AZ, and as shown in FIG. 2 is provided to control the cycle of operation. A pulse transmitter or generator TG provides the pulse phases. The latter generator is not shown but is described in co-pending application, Ser. No. 390,026, filed on Aug. 17, 1964 in the names Otto Kneisel and Horst Honold and assigned to the same assignee as the present application.

The signal generator AZ is designed to provide at each count advance a different identification, such as a connection number, at its output A1. The number of different identifications stored in a signal generator determine the extent of the cycle of that generator. If there are 1,000 identifications or addresses and 100 pulse phases for each identification, and further if each pulse phase is one microsecond in length, an identification cycle must last at least 100 milliseconds. If operation cycles are provided in the system, the identification cycle is prolonged. On the other hand, if fewer identifications are provided by the signal generator, the identification cycle will be shorter. This is quite possible in signal generators provided for calling sets and digit receivers, such as the generators like those identified as ZT and ZX.

In the apparatus of FIG. 2 a stored identification is provided at the output of a circulation storage device such as U$a$ for the time period for such as one microsecond every 100 microseconds. In other words, the circulation storage device is operative to provide at its output (such as E) whatever identification was stored therein, repetitively in the same pulse phase. For this purpose, the identification may be stored in a magnetostrictive wire which is provided with appropriate control systems (such as shown in the said co-pending application Ser. No. 390,026). In such fashion the identification provided by the circulation storage device may be compared with the identification simultaneously provided by the signal generator, and an identity will be indicated in the event that the identification then provided by the signal generator is the same as that previously stored in the circulation storage device. In such fashion it may be ascertained whether the identification provided at any time by the signal generator is registered in a circulation storage device in any pulse phase.

As has already been mentioned, in accordance with the time multiplex system employed in the operative embodiment, a certain pulse phase (a so-called "call phase") is assigned to each speaking station seeking to make the connection, upon the lifting of the receiver from the hook. During the entire period which it takes for the connection to be made and during the entire duration of the call with the second station, this pulse phase remains assigned to that connection.

In the time multiplex system described herein, 100 pulse phases are provided. Each pulse phase is, for example, repeated every 100 microseconds. The identifications or connection numbers of a speaking station which is participating in the making of a connection or in a connection already made, thus receives a certain pulse phase for the duration of a call.

Figure 1:
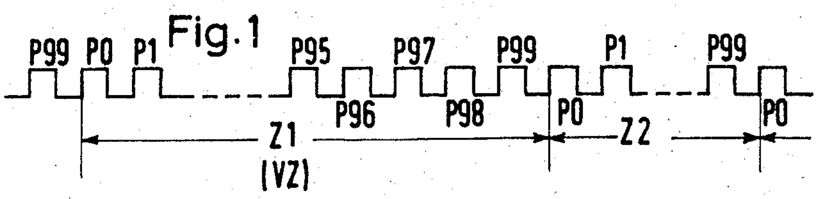
FIG. 1 shows in schematic fashion the time diagram for the cycle and pulse phases thereof, for a telephone installation operating in accordance with the time multiplex system.

In FIG. 1, the time diagram indicates the use of 100 pulse phases P0 to P99 in a phase cycle. Pulse phases P1 to P94, for instance, may be used as "call phases" and may therefore be assigned to the separate connections to be made for the entire duration of the dialing operation and the speaking operation in each connection. The remaining pulse phases P95 to P0 are called "control phases."

A pulse phase such as P1 assigned to a connection thus is repeated after each cycle, for instance, Z1, Z2, etc. That is, such pulse phase is repeated every 100 microseconds in the illustrative embodiment. Each time that the pulse phase P1 appears, all identifications of speaking stations participating in the connection to which that pulse phase has been assigned are collected, presuming that the connection number of one of the speaking stations participating in that connection is at the same time provided by signal generator AZ. The collected identifications are identified and evaluated in the central control apparatus S*t*E in accordance with the switching condition provided for each operation. If it is ascertained, for instance, that a connection number provided at that time at the output of signal generator AZ, at a time such as P1, is participating in either the formation of the connection or an existing connection, a corresponding identification is stored. If a new identification is added to the identification already stored at the particular time, such new identification not having been available during the previous phase cycle, a new evaluation of the various "lined up" identifications is necessary. This evaluation can be made in an operation cycle which immediately follows an information cycle, presuming that the evaluation of the identifications occurs both in dependence upon the conditions existing and under the connection number switched on at the output of the corresponding signal generator at that time. The evaluation, however, can also occur independently of the cycle of the signal generator and only in dependence upon the phase cycle.

Assuming the system is dependent upon the operation of the signal generator, the operation can occur only in an operation cycle after completion of an information cycle. On the other hand, if no operation cycle is required, the signal generator may repetitively go through the information cycle, so that the same identification or connection number is repeated every 100 microseconds. In such case, that is, with continuous operation cycles, the cycle of the signal generator is of no significance and only the phase cycle determines the emission of orders or commands from the central control apparatus. These orders or commands may then cause the pickup of new identifications and by reason of receipt of these identifications, the performance of new control processes and emission of new commands.

FIG. 2 shows the functional relationships of the elements of the telephone installation operating in accordance with the time multiplex system. The telephone installation shown in FIG. 2 is a secondary telephone installation with speaking stations N1 to N*x* and with exchange office lines AL*x*. Speaking stations N1 to N*x* can be connected with the speaking multiplex point or path SM through operation of speaking switches SN1 to SN*x*. These speaking stations are to be controlled for this purpose. On the other hand, the exchange office transmission device AU*ex* may be connected to the same speaking multiplex point SM through operation of speaking switch SA*x*. All these switches are controlled by pulses provided from circulation storage devices or stores U*a* or U*b*.

In addition, an exchange position VP*x* may be connected with the speaking multiplex point SM through operation of the speaking switch SP*x*, controlled by circulation store U*p*. Further, a digit receiver ZE*x* may be connected to the same multiplex point through a switch SZ*x*, and a signal generator Z (such as a busy signal generator) may be connected to the same point by switch SB.

A speaking station, exchange office line, or exchange position, is connected to the multiplex point every 100 microseconds upon appearance of the pulse phase assigned to that speaking station, exchange office line or exchange position. Normally, there are stored in circulation storage device U*a*, for example, the connection numbers of call*ing* speaking stations and exchange office lines. On the other hand, in circulation storage device U*b*, the identifications (such as the connection numbers) are stored for called speaking stations, in accordance with switching condition, as are also stored the identifications of "calling" exchange office lines. The identification of the calling sets of exchange positions may similarly be stored in circulation storage device U*p*, while a similar arrangement is made for the digit receiver, including store U*z*.

As has been mentioned above, identifications of stations, etc., taking part in the same connection, are stored in the various storage devices in the same pulse phase. Each storage device is connected to a decoder which has as many outputs as the speaking stations, exchange office lines, calling sets (to each exchange position several calling sets may be assigned) or digit receivers as are assigned thereto. Each speaking switch such as SN1 to SN*x* and SA*x* is connected to an output of each of decoders D*a* and D*b*. In order that the decoders will be isolated from each other, logical OR lattices or isolation devices may be connected between them to prevent interference therebetween.

If an identification, such as a connection number of a speaking station, is supplied to a decoder such as D*a*, a pulse is emitted at an output thereof, such as A2. This pulse is assigned to the particular speaking station connected to that output and to be connected in a connection already made or to be made. This pulse is then used for closing the speaking switch, such as SN1, assigned to this speaking station. If, at the same time, at the output of decoder D*a* assigned to speaking station N1, and at the output of the decoder D*b*, assigned to an exchange office transmission device, there appears a pulse of the same phase, the speaking switches assigned to these two connection stations are switched together temporarily by way of the multiplex point SM. This condition is then repeated periodically (in the illustrative embodiment every 100 microseconds) at the same circulation cycle of the circulating identifications in the stores U*a* and U*b*.

For illustrative purposes it will now be assumed that a connection is to be formed between a speaking station N1 and an exchange office line AL*x* of the secondary installation. The party of station N1 lifts the receiver from the hook and thus gives a signal requesting a free pulse phase. Since signal generator AZ sequentially switches on at its output an identification of each of the assigned connection numbers, every one hundred milliseconds, the identification of speaking station N1 will be provided at some time during this period. The control apparatus S*t*E will then check the calling condition of this speaking station by the inquiry pulse P0. A signal is then given to the control apparatus by way of the signal multiplex line SMLA identifying the calling condition of the station N1.

Next the control apparatus must determine whether a free pulse phase is available for the connection which is desired to be made by the party of station N1. If such a phase is available, it is assigned to the speaking station N1 for the further buildup of the desired connection and for the duration of the call if the connection is completed. Then, the control apparatus operates the switch D1 connected to the circulation storage device U*a* to close the switch to connect the store to the signal generator AZ. This connection is at the assigned pulse phase, such as P1, and enables the storage device to receive for storage, a coded identification of the station N1, in the assigned pulse phase.

Circulation storage devices appropriate to the apparatus have been more fully described in conjunction with the said co-pending application, Ser. No. 390,026.

Suffice it to say here that they may be simple magnetostrictive systems which provide stored pulses every predetermined time interval, such as 100 microseconds as in this case. As has been more fully described in conjunction with the above application, any pulse furnished at the output E of the storage device U*a* is provided through to the decoder D*a* only in the event that the switch S*p*1 is operated at the same time. This requires that the control circulation storage device U*da* be furnished with a pulse at the same pulse phase assigned to the new connection to be made by the station N1. If such occurs, the speaking switch SN1 is operated with the phase assigned to the station, such as P1.

After the connection number of the calling station N1 is stored or registered in the circulation storage device U*a*, the control apparatus S*t*E causes seizure of a free digit receiver ZEx and the control apparatus further operates in the same manner indicated above to cause storage in the storage device Uz of the identification of the seized digit receiver, at the same pulse phase. The digit receiver ZE*x* is then switched to the speaking multiplex point SM by way of the switch SZ*x* at the same pulse phase in each cycle as is the station N1.

As a result of these connections, the digit receiver ZE*x* receives the identification digits sent by the speaking station N1 to identify the station which is desired to be called. These identification digits, sent in coded fashion, are converted by means of the digit receiving means Z*i* into binary, direct current-coded signals. They may then be registered with the phase P1 in the circulation storage device U*b*, for example even without temporary storage as by operation of a switch connected therebetween. In this registration operation, the direct current signals may be checked for accuracy by a control apparatus which is not shown.

At the time that the identification of the desired speaking station is registered in circulation storage device U*b*, the central control apparatus S*t*E automatically inquires as to whether the connection number or identification of the called speaking station is already registered in either of the stores U*a* and U*b*. This operation may be performed by the use of appropriate comparison devices, not shown, but operating with the outputs of these stores. A "switching through" to the station to be called can occur only if that station is free. This "switching through" is accomplished through operation of either of switch S*p*1 located between the output of storage device U*a* and the input of decoder D*a*, or by switch S*p*2 located between the output of store U*b* and decoder D*b*, depending on which storage device stores the identification of the called station. In the illustrative case, the switch S*p*1 is already operating at the assigned pulse phase P1 to connect the calling station N1 to the speaking multiplex point SM. Therefore, the switch S*p*2 must operate to connect the called station to the same multiplex point.

The switch S*p*3 is located between the output of circulation storage device U*p* and corresponding decoder D*p*. Each of the switches S*p*1, S*p*2 and S*p*3, when in open or "rest" position, prevents the operation of the corresponding decoder by the associated circulation storage device. Each switch, however, is closed by impulses provided from a control circulation storage device, such as U*da*, which closes switch S*p*1. When closed, the switch permits the identification appearing at the output of the circulation storage device to reach the corresponding decoder D*a*.

The switches such as S*p*1 are only supplied with pulses to close the switches when it is found in a control apparatus S*t*E that the desired speaking station is still free, this finding being dependent upon the check of the identification with the assigned pulse phase.

With this system, including the use of switches operated by the auxiliary storage devices such as U*da*, several identifications circulating with different phases can be emitted from the main storage devices, independently of each other, so that several connections can be made through the single multiplex point SM. The maximum number of connections that can be made is of course determined by the number of pulse phases provided by the pulse generator. The availability of a through switch, such as S*p*1, makes it possible to avoid the use of special temporary storage means which would otherwise have to be provided for the storage of the identification number of such as called speaking stations.

The actuation of the switches such as S*p*1 is not only dependent on the switching condition of the calling or called connection stations, but also on other switching conditions. Such other conditions include the possibility of emission by one of the stations of a connection of a special identification, such as a reconfirmation signal. In this case at least one of the stations participating in the original connection must be switched off from the signal multiplex point, or rather prevented from being switched to that point. This is accomplished in simple fashion by preventing the corresponding switch, such as S*p*1, from being used with the pulse available at the output of the corresponding control storage device, such as U*da*. For this purpose the pulse in control store U*da* of the same pulse phase can be cancelled. In retracing the call, the pulse may be again stored in control store U*da*, so that the switch S*p*1 may be actuated at the appropriate pulse time.

In the fashion described the switches associated with the various circulation storage devices, depending on various switching conditions, can be made ineffective in order to prevent one of the parties of an original connection from being switched to the multiplex point. The control of these switches is accomplished in each case in dependence on the pulses circulating in the corresponding control storage device, such as U*da*. The pulses for these storage devices are provided by control apparatus S*t*E by means of registration pulses of the corresponding pulse phases which are transmitted thereto. Each time when the appropriate pulse appears at the output of the control storage device, a pulse is also given to the corresponding switch S*p*1. These pulses therefore control the transmission of the actuating pulses for the speaking switches, such as SN1.

The control circulation storage devices, such as U*da*, may be identical in construction with parts of the other storage devices, such as U*a*, all of which contain what might be termed "travel time links," formed by a wire of appropriate length which can be provided with pulses and will transmit such pulses the length of the wire by magnetostrictive action. In each case the pulse arriving at the end of the wire is immediately fed to the input of the wire, so that a cyclic or periodic circulation of a pulse may occur until that pulse is intentionally cancelled. Such a system is more fully described in the said copending application Ser. No. 390,026.

The identification of speaking stations participating in a connection, such as N1, and of the exchange office transmission device participating in a connection, such as AU*ex*, in each case appears simultaneously at the outputs or exits of the decoders D*a* and D*b*, at the same time as the connection is switched through by way of the corresponding speaking switches and multiplex point. That is, in the illustrative embodiment, the identifications of the stations participating in a connection are available at the exits or outputs of the corresponding storage devices U*a* and U*b*, and the corresponding speaking stations are connected to the signal multiplex point every 100 microseconds. Changes in the switching condition during a connection are ascertained at the signal generator output at the time the address of the station emitting the signal is available at the output of the signal generator, when that station has emitted a special signal indicating the desirability of the change. Depending on the nature of the switching condition change, corresponding control processes are then initiated in the control apparatus S*t*E. In that control apparatus lattices and flip-flops circuits are operated under the control of feed information signals, and furnish commands for the emission of new information, such as for the control of switches.

The feeding of signalling information to the control apparatus is under the control of such devices as the comparison means VA, VB, VP and VZ. In each case these devices are shown in FIG. 2 with corresponding output conductors *va*, *vb*, *vp* and *vz*, these conductors providing control signals to the control apparatus S*t*E if there is available at the output of the corresponding signal generator AZ, AZ, ZP or ZX, an identification of the speaking station or transmission device, etc. which is simultaneously provided at the output of the corresponding storage device UA, UB, UP and UZ, respectively.

The apparatus of FIG. 2 is capable of allowing the buildup of a reconfirmation connection from an existing connection between such as station N1 and exchange office transmission device AU*ex*, the existing connection being by way of such as pulse phase P1. In this case the identification of the speaking station N1 is stored at phase P1 in the circulation storage device U*b* (provided for call*ed* connection stations) since the speaking station N1 is the station called by the exchange office wire. The identification of the exchange office transmission device AU*ex* is stored in circulation storage device U*a* (for call*ing* connection stations), since that is the calling station.

If the station N1 employs a reconfirmation key, for example the eleventh digit key, during the existing connection with the exchange office, then the loop condition of this speaking station N1 is changed and is determined at the pulse phase P1 assigned to the existing connection. A free digit receiver ZE*x* is requested and the emitted identification is picked up in the digit receiving means Z*i* by way of the seized digit receiver ZE*x*. As indicated above, the digit receiving means Z*i* has a checking device ZZ assigned to it which ascertains whether the signal received is a reconfirmation connection.

The checking device ZZ provides a pulse identifying the reconfirmation condition which is transmitted to the control apparatus S*t*E by way of conductor *zz*. It is simultaneously ascertained in the control device that identifications are picked up with this same phase P1 in circulation storage device U*a* and storage device U*b*, so that the control apparatus recognizes that a call connection already exists. Further, at phase P1 a pulse is conveyed to the control apparatus S*t*E by way of signal multiplex line SMLB caused by the change in condition of the party circuit T1. This change in condition reaches the multiplex line SMLB through operation of the storage device U*b*, the decoder D*b*, as well as the speaking switch S*p*2. By this signal it is identified over the signal multiplex line SMLB that the speaking station N1 has given a signal to initiate reconfirmation, during an existing connection with a calling exchange office connection. By reason of all of these identifications "lined up" at the entrances or inputs to the control apparatus at the same time, an evaluation of these identifications having the phase P1 is made, and through the operation of different AND and OR lattices and by way of flip-flop circuits, command pulses are formed by the control apparatus.

First, a pulse is stored in special circulation storage device RB, at the phase P1, in order to identify the fact that the called station N1 identified in the circulation storage device U*b* at that phase, is the one which emitted the signal to initiate reconfirmation. The impulse circulating in the special store RB is then furnished at phase P1 to the central control apparatus S*t*E over the conductor *rb'*, and the signals provided at the same time over the conductors *va* and *vb* (identifying the calling condition) are simultaneously evaluated by the control apparatus by appropriate logic circuits in such fashion that a pulse is provided over conductor *db'*. This pulse is directed to auxiliary storage device U*db* to cancel the identification of the pulse phase P1 in that store. (It will be evident that if the exchange office station was the one requesting the reconfirmation connection, the control apparatus could provide a cancelling pulse over line *da'* to store U*da*.)

As the result of this cancellation, the switch S*p*2 is no longer closed at phase P1 so that the speaking switch SN1 is no longer closed to switch station N1 to the speaking multiplex point at phase P1. Moreover, by reason of the signals given to the central control apparatus S*t*E (that is, by reason of the recognition of the reconfirmation signal of speaking station N1) a new free pulse phase, such as P2, is provided for the speaking station N1. With this new phase P2 a new call connection such as a reconfirmation connection can be made.

If it be assumed that the Station N1 dials the station N*x* in the reconfirmation connection, the identification of the station N1 will be stored with phase P2 in the circulation storage device U*a*, in similar fashion to the storage with an original call, and the identification of the station to be reconfirmed (N*x*) will be stored in storage device U*b*.

The exchange office party of course cannot listen in to the reconfirmation call since the identification of this party is stored in storage device U*a* with phase P1, while the station N1 is not connected to the speaking multiplex point SM with that phase, but rather only with the phase P2. Moreover, the existence of the reconfirmation call is identified by the registration of a pulse in special storage device RG with the phase P2.

The apparatus more specifically shown in FIG. 3 explains the manner in which resumption or retracing of the original exchange office connection to the reconfirming speaking station can occur. If, during the existing reconfirmation connection, the party of speaking station N1 again operates the reconfirmation key, the change in loop condition is ascertained and a free digit receiver ZE*x* is requested, in the same manner as previously described. Through digit receiving means Z*i* and checking device ZZ, it is ascertained that a reconfirmation identification has been emitted. The emission of the new reconfirmation identification can be conveyed to the control apparatus either when no reconfirmation phase is assigned to the reconfirmation connection, or during the existing reconfirmation connection.

The first operating case to be described is one wherein, after emission of the reconfirmation signal for the initiation of the reconfirmation, it is determined that no reconfirmation phase is available for assignment to the reconfirming speaking station. Thus, after the pulse has already been cancelled in auxiliary storage device U*db*, no free phase is assigned to the new connection. In this case an impulse is given by the comparison apparatus RB with the phase P1. This pulse identifies the emission of the reconfirmation signal by the speaking station N1 which has been identified in circulation storage device U*b*. In other words, this pulse indicates that the reconfirmation was initiated by a station which was a call*ed* station. At the same time the checking means provides a signal over conductor *zz*, indicating a new reconfirmation request.

The lattice AND G1 of the control apparatus S*t*E then identifies the coincidence of these two signals and operates the flip-flop K1. This flip-flop in turn operates the flip-flop K2 at a particular "control" phase as for example P96.

At the same time it is ascertained in a special comparison device VP' that a reconfirmation signal exists with a phase P1 and that no pulse phases are free. In the control apparatus the pulse phase P1 is circulating in a travel time link PS, so that the lattice AND G2 indicates a coincidence and provides a pulse to the travel time link LZ. The travel time link LZ provides for a delay between the information and operation cycles and, during the operating cycle, provides an input to the logical AND or lattice AND G3. The output of the AND G3 is directed to three different locations over the conductors *bs*, *rbl*, and *db*.

It will be apparent that the actuation of the logical AND G3 need not be dependent upon information and operation cycles, and the circulation of the pulse phases in a circulation storage device such as LZ. The evaluation of the signals can also be accomplished independently of the pulse cycles. In this case the removal from storage of the commands will be done in similar fashion to the operation of the control apparatus by a circulation storage device LZ, with phase P1. In each case control commands are given with phase P1 by operation of the lattice G3.

The line *bs* provides a pulse from the control apparatus to a control circulation storage device U*s*, at phase P1. This pulse directly operates switch SB at the same phase, so that the signal transmitter Z is switched to the multiplex line SM at phase P1. This signal generator may provide a busy signal, indicating that no free pulse phase is available to make the new connection requested.

An impulse for the cancellation of the signal circulating in the auxiliary storage device RB is provided over conductor *rbl* from the control apparatus. This signal therefore cancels the identification of the first reconfirmation. At the same time over conductor *db* a pulse is provided for control storage device U*db*, at phase P1, so that the switch S*p*2 may again be operated with the phase P1. Thereby the speaking switch SN1 can again be operated at phase P1, through actuation of storage device U*b*, decoder D*b* and operation of switch S*p*2, all at the same pulse phase. Thereby the station N1 and the party of the exchange office are again connected together by way of the speaking multiplex point at pulse phase P1.

The original connection parties may hear for a short time the busy signal provided by the signal generator Z, or any other special signal. However, if the exchange office party is not supposed to hear such a signal, then the pulse circulating with phase P1 in the control storage device U*da* can be cancelled at the time the reconfirmation condition is initiated, so that this switch S*p*1 can no longer be activated to connect the exchange office transmission device to the speaking multiplex point at phase P1. In this case the part of the station N1 will have to provide a special signal, after receipt of the busy signal, to switch the original connection back on, or otherwise the busy signal may be dependent upon time to be given only for a certain period of time. In such fashion a new impulse with phase P1 may be supplied to and circulated in storage device U*da* to be picked up periodically at phase P1 so that the exchange office transmission device is again switched to the speaking multiplex point at phase P1. The original exchange office connection then exists once more.

The same condition will exist if the station identified with phase P1 in the storage device U*a* (a calling station) has initiated the first reconfirmation and this fact is identified by a pulse stored in storage device RA at that phase. This alternative is provided by the connections including the logical AND G4, the flip-flops K3 and K4 etc. Then, the output signals are provided over conductors *bs, ral,* and *da* so as to provide the busy signal, the cancellation of the reconfirmation signal and the reactivation of the switch S*p*1.

In conjunction with description of the apparatus of FIG. 4 it will be assumed that an original connection existed between calling exchange line AL*x* and called station N1, at phase P1; that the speaking station N1 requested a new free pulse phase for making a reconfirmation connection, that such a pulse phase was available and assigned to the station, and that the connection was made with pulse phase P2 to the speaking station *Nx*. If, during the time that this reconfirmation connection exists, the party of speaking station N1 again activates the reconfirmation key, a free digit receiver ZE*x* is thereby requested. The digit receiving means then supplies an indication to the checking device ZZ which confirms that reconfirmation has been again requested. At this time the identification of the reconfirming station N1 will be circulating in storage device U*a*, and the speaking station N*x* will have its identification circulating in storage device U*b*, both at phase P2. In dependence upon the condition of the conductors *va* and *vb* at the phase P2, and the conductor *zz* at the same phase, a circulation storage device RA will provide a pulse at phase P2, thereby identifying that the reconfirming party of speaking station N1 has once again given a signal by means of the reconfirmation digit key.

Referring now more specifically to the logic elements of FIG. 4, at phase P2 a signal is provided by way of conductor *va* to control apparatus S*t*E, and more particularly to logical AND G*a*1, thereby identifying storage of the connection number of station N1 in storage device U*a*, at connection phase P2. Further, auxiliary storage device RA provides a pulse with phase P2 over conductor *ra'* to the same AND, indicating that the reconfirming station has again requested reconfirmation. Moreover, the special circulation storage device RG indicates by a pulse circulating with phase P2 that the existing reconfirmation call is at this phase. Thus a signal is provided to the AND by way of the conductor *rg'*.

The coincidence of all three of these signals at the input of AND G*a*1 provides an output signal from that circuit which operates the flip-flop K*i*1.

The input of another logical AND G*a*2 is provided with a pulse at phase P1 by way of the conductor *vb*, since the circulation storage device U*b* still contains the stored identification of the original called station, namely N1, at that phase. Since no reconfirmation call exists with the phase P1, no signal is available at the conductor *rg'* at that time. Nevertheless, the circuit is provided with an appropriate negation element, or an inverter, such that a pulse is available at the input to the AND G*a*2 when no pulse is available on conductor *rg'*. Such inversion is indicated by the dot at the corresponding input to AND gate G*a*2. A pulse is also available at the first input of AND G*a*2 by way of conductor *rb'* at phase P1, since such a pulse was stored in the auxiliary storage device RB indicating reconfirmation initiation by the original called station N1 in the original called phase. The logical AND G*a*2 therefore furnishes an output pulse to the flip-flop K*i*2 to operate that circuit.

Since flip-flop K*i*1 is operated, the logical AND G*a*3 is furnished with a pulse at an appropriate pulse phase, so that the flip-flop circuit K*i*3 is operated.

The apparatus shown in FIG. 4 is designed for an operation wherein the evaluation of the control signals takes place in an information cycle and the emission of commands occurs in an operation cycle. In such case the logical AND G*a*5 is operated by coincidence of pulses on all three of its inputs. The first pulse is provided from a logical OR G*a*4 which is supplied with an input pulse at phase P1 from conductor *vb*. Similarly, a logical OR G*a*6 is simultaneously provided with a pulse from storage device RB, as indicated above. Finally, the absence of the output on conductor *rg'* at phase P1 is inverted and furnishes a pulse at the third input of the AND G*a*5.

The output pulse from AND G*a*5 is supplied to a circulation storage device UPL which furnishes an appropriate time delay which may be of 100 microseconds, in the illustrative example. At the end of this time delay a pulse is provided to one input of the logical AND G*a*7. Since the flip-flop K*i*3 is operated at this time there is a coincidence at the inputs of AND G*a*7 so that an output is provided over each of conductors *rbl* and *db,* at phase P1.

The conductor *rbl* conveys a pulse with phase P1 for the cancellation of the pulse circulating in auxiliary storage apparatus RB. As a result no further indication of the initiation of the reconfirmation circuit is given by that storage device. The conductor *db* provides a pulse to the control storage device U*db* to re-insert an impulse with phase P1 in this circuit and control switch S*p*2 at the same phase. Since the station N1 still has its identification stored in the corresponding circulation storage device U*b,* at this pulse phase, an appropriate pulse is provided to the decoder by this circuit and the switch S*p*2 operates at phase P1, so that speaking station N1 is switched to the multiplex point over speaking switch SN1 each time that phase P1 arrives.

In addition to these operations, the operation of logical AND G*a*1 furnishes an input pulse to a travel time link which of course is similar to the various storage devices and is identified by the letters R*u*PL. This travel time link is a delay device of 100 microseconds and provides an input pulse at time P2 to a logical AND G*a*9. With flip-flop K*i*3 operated at this time the logical OR G*a*8 provides another input to the AND G*a*9. The AND G*a*9 therefore indicates a coincidence by supplying a pulse over conductor *rpl*. This pulse is at phase P2 and causes cancellation of the assignment of pulse phase P2 to the reconfirmation call in a fashion not shown. In the same manner cancellation of all identifications circulating with this pulse phase P2 is effected.

As a result of these various operations, the speaking station N1 is connected to the exchange office transmission device AU*ex*, by circulation at phase P1 of pulses in the respective storage devices U*a* and U*b*, the decoders D*a* and D*b*, the switches S*p*1 and S*p*2, and the speaking switches SN1 and SA*x*.

It will be seen from further examination of FIG. 4 that a corresponding set of steps will occur in the event that it is the station identified in store U*a* (the calling station) which emits the first reconfirmation identification to be stored in the auxiliary storage device RA. In such event signals are emitted from the control apparatus over conductors *ral, da,* and *rpl.*

Figure 5:
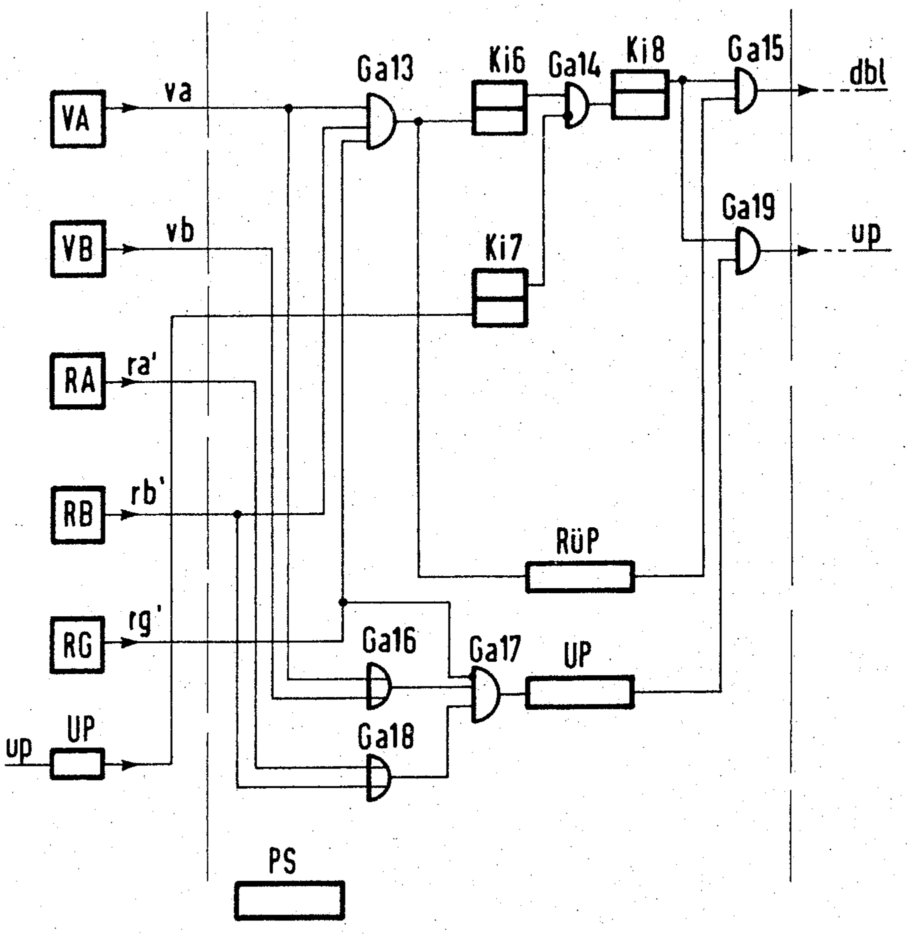
FIGS. 5–8 show some operative examples for the shifting of such as exchange office connections.

Turning now to FIG. 5, the elements of the control apparatus S*t*E which provide for the shift of an exchange office connection to the reconfirmed speaking station are there shown. It is assumed initially that a connection existed between a calling exchange office line AL*x* and a called speaking station N1 at connection phase P1 and that the party of the speaking station N1 has given a signal to initiate a reconfirmation. It is further assumed that such reconfirmation was set up with the party of speaking station N*x* at phase P2. By reason of the original connection, the identification of the exchange office line AL*x* is still stored at phase P1 in the circulation storage device U*a* and the identification of the speaking station N1 is stored in phase P1 in the circulation storage device U*b*. In the reconfirmation connection the identification of the reconfirming speaking station N1 is stored at phase P2 in the circulation storage device U*a* and the identification of the reconfirmed speaking station N*x* is stored at phase P2 in the storage device U*b*. If the party of the reconfirmed speaking station N*x* now operates the reconfirmation identification digit key during his connection with the station N1, for the initiation of the shift of the exchange office connecton to connection with the station N*x*, the original assigned pulse phase must be sought. It should be mentioned here that the initiation of the shift during the reconfirmation can also be accomplished by the reconfirming speaking station, as distinguished from the reconfirmed speaking station. This only means that a corresponding exchange of the switch of the signals to the corresponding logical circuitry of the central control apparatus must occur. Nevertheless, in the example to be described it is assumed that the reconfirmed speaking station (N*x*) initiates the shift.

When the shift is initiated, a loop change is identified in the party loop of the speaking station N*x* and a free digit receiver ZE*x* is seized. By way of the digit receiving device Z*i*, the checking device ZZ ascertains that the party of a speaking station has initiated a reconfirmation identification, and by way of the signal multiplex line SMLB it is identified that the party N*x* is the one who initiated the identification.

Referring now more particularly to FIG. 5, a pulse of phase P2 is therefore supplied over each of conductors *va* and *vb,* indicating connection together of those stations at phase P2. At the same time a pulse is provided to the central control apparatus with the phase P2 over conductor *rb′* indicating that the party whose identification is stored in called store U*b* at phase P2 (N*x*) has given the signal to initiate the shift. Consequently, signals are available at two of the inputs of logical AND (G*a*13. The third input of the AND is connected to the conductor *rg′* which receives a pulse at phase P2 to identify the existence of a reconfirmation call at that phase. With all three inputs energized at phase P2, an output is supplied by the AND G*a*13 to operate the flip-flop K*i*6.

In installations wherein the control processes do not occur in respective information and operation cycles, the control of the switching processes will occur independently of the phase cycles and the control commands are switched on by means of travel time links at the corresponding outputs of the control apparatus, in accordance with phase. However, in the example shown in FIG. 5, the process of evaluation of the commands is assumed to be dependent on the phase cycles. Therefore, a special circulation storage device UP is provided outside of the central control apparatus and supplied with a pulse of the original connection phase P1. Therefore, at phase P1 the flip-flop K*i*7 is operated. However, at pulse phase P2 the flip-flop is not actuated and a negation or inverter circuit provides a second input for the logical AND G*a*14. The first input of the AND is supplied by the flip-flop K*i*6 at time P2. The AND G*a*14 therefore provides an energizing pulse for flip-flop K*i*8 to operate that flip-flop.

One input of the logical AND G*a*15 is therefore provided with an energizing pulse at time P2, and the other input is also actuated with the same pulse phase by the output of a transit time link R*u*P connected between the output of logical AND G*a*13 and the second input of logical AND G*a*15. The output of AND G*a*15 therefore supplies a pulse over conductor *dbl* at phase P2. This pulse cancels the pulse of phase P2 in the control storage device U*db*, so that the reconfirmed speaking station can no longer be connected to the multiplex point with phase P2, since the switch S*p*2 can no longer be operated by storage device U*db* at that phase.

A logical OR G*a*16 is provided with a signal at phase P1 by comparison device VB, since the identification of station N1 is still present in storage device U*b* at that phase. That pulse is then transferred to logical AND G*a*17. Moreover, a conductor *rb′* at this time provides a pulse which reaches the AND G*a*17 by way of OR circuit G*a*18. Since no reconfirmation call exists at phase P1, no signal is provided on the conductor *rg′* at this time. The absence of that signal is inverted at the input of AND G*a*17, which then indicates a coincidence. An impulse is then supplied to a transit time link UR in the central control apparatus, at phase P1. After a time delay of 100 microseconds the logical AND G*a*19 is provided with an input at phase P1. Since the flip-flop K*i*8 is operating at this time, the AND G*a*19 indicates a coincidence and supplies a pulse over conductor *up*. As indicated, the output of the logical AND G*a*19 is the *up* line connected to the special circulation storage device UP previously referred to. The pulses in this storage device serve to identify the original connection phase, so that a pulse is registered at phase P1 therein.

With the above described operations the phase P1 assigned to the original connection between the speaking station N1 and the exchange office transmission device is identified and stored in the special circulation storage device UP.

In conjunction with FIG. 6, the switching processes which occur while the shift from the original connection (for example the exchange office connection to the speaking station N*x*) occurs, will be described. At the input of logical AND G*a*20 connected to the conductor *vb* the occurrence of a pulse of phase P2 indicates that the identification of the reconfirmed speaking station N*x* is stored in storage device U*b*. Further, the storage device RB furnishes a second input to the logical AND G*a*20, indicating that station N*x*, identified in the circulation storage device U*b* with phase P2, is the one which furnished the second reconfirmation identification. In addition, the storage device U*db* itself furnishes an absence of an indication at time P2, since that phase was cancelled in auxiliary storage device U*db*. That absence is transferred into a presence by a negation circuit or an inverter, so that a further input is available at the AND G*a*20. Finally, the circulation storage device RG furnishes to the AND G*a*20 an indication that a reconfirmation circuit exists in phase P2.

As a result of all the inputs being present at the AND G*a*20, an output is furnished to the flip-flop circuit K*i*9 to operate that flip-flop.

The logical AND G*a*21 is also operated, since the special store UP furnishes an output over its conductor *up′* at this time, identifying the original connection phase P1, and since the storage device RB provides a second input to the AND over the conductor *rb'*, indicating the initiation of the first reconfirmation with the original phase P1. As a result, the AND Ga21 furnishes an actuating pulse for the flip-flop Ki12, and that flip-flop operates.

There are at inputs 1 and 2 of logical AND Ga22 appropriate voltages such that a coincidence is indicated and the flip-flop Ki13, connected to the output of the AND, is operated.

The flip-flop Ki13 is connected to one input of logical OR Ga23. The output of that OR is connected to one input of the logical AND Ga24. The other input of AND Ga24 is supplied by the time delay device RuP whose input is supplied with the output of the logical AND Ga20. The time delay is 100 microseconds to provide for control in an operation cycle following the information cycle of the control apparatus.

In the operation cycle a pulse is provided from the output of logical AND Ga24 to cancel the reconfirmation phase P2, this pulse being supplied over conductor *r0*. Through apparatus not shown the presence of the pulse on conductor *r0* causes the cancellation of the identifications circulating in storage devices U*a* and U*b* with phase P2, by furnishing pulses over conductors *rpl* and *rpl'* connected to those storage devices. In addition, the pulse circulating in the auxiliary storage device U*da* is simultaneously cancelled, that pulse being at the same phase P2.

Phase P1 which was originally assigned to the connection now serves as a shift phase and the logical AND Ga25 is operated in that phase. One input of logical AND Ga25 is obtained from the flip-flop Ki13, whose operation has already been described. The other input is obtained from travel time link UR, with the input to that link being supplied by the special storage device UP in which the original phase P1 was stored. The travel time link furnishes a time delay of 100 microseconds to allow operation of the AND Ga25 in the operation cycle following the information cycle. When the AND Ga25 indicates a coincidence, voltages are available at its output on conductors *udb*, *rbl*, and *d2*.

The conductor *d2* is connected to the switch D2 in FIG. 2 and this switch closes to connect the store U*b* to the generator AZ. The identification of the reconfirmed speaking station which at that time is provided at the output of the signal generator is therefore stored with phase P1 in the circulation storage device U*b*. The pulse provided over *udb* provides for storage of a pulse in the control circulation storage device U*db* for operation of switch Sp2 at phase P1. As a result, the station N*x* can be switched to the multiplex point with the phase P1, the exchange office line AL*x* being already provided for at the same phase.

The conductor *rbl* provides for the cancellation of the pulse which was registered at phase P1 in the auxiliary storage device RB identifying the original reconfirmation emission.

If the reconfirmation connection is such that the party of the exchange office line AL*x* is identified in the circulation storage device U*a* and it is this speaking station which emits a reconfirmation signal for the initiation of the shift, then signals are conveyed of similar purpose to those furnished by logical AND Ga25, but are rather conveyed by logical AND Ga26 which is of similar function.

Figures 7, 8:
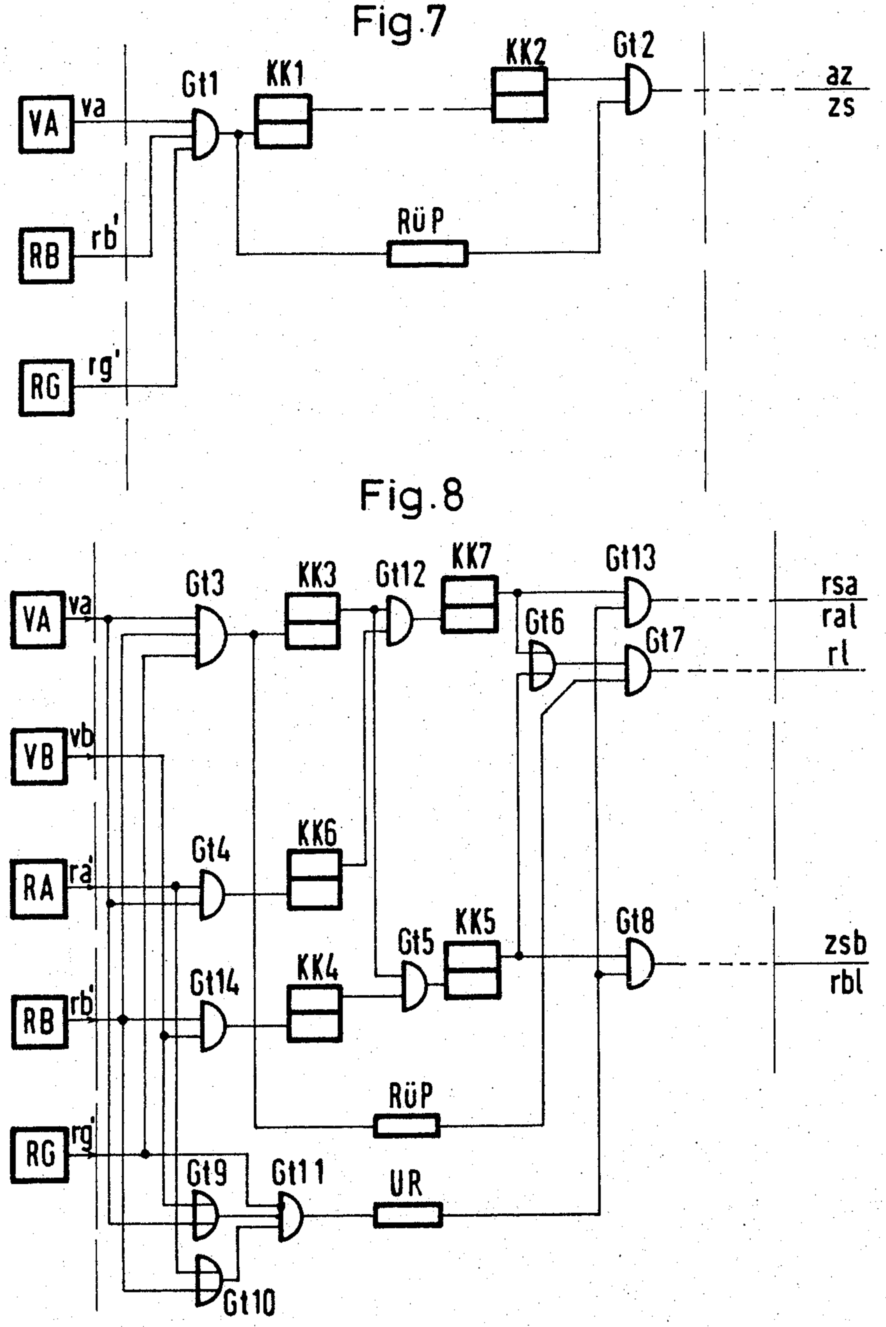

Turning now to FIGS. 7 and 8, the apparatus which cooperates to provide for the shift of a connection between a speaking station N1 and an exchange office transmission device AU*ex*, by use of a temporary storage device, will now be described. It is assumed that the identification of the called speaking station N1 is picked up with phase P1 in the circulation storage device U*b*, and that the identification of the calling exchange office transmission device is stored in circulation storage device U*a* in the same phase. If the party of speaking station N1 should then operate the digit key requesting reconfirmation, the phase P2 is further assumed to be assigned for the production of this reconfirmation connection, which may be for example with speaking station N*x*.

It is assumed further that during the reconfirmation connection the speaking station N1 is identified in the circulation storage device U*a* and the speaking station N*x* in the circulation storage device U*b*, both with the phase P2. Also, it is assumed that the party of speaking station N*x* operates the digit key for initiation of the shift (for example the reconfirmation key or the eleventh digit key) during the reconfirmation connection with the party of speaking station N1. In this case a free digit receiver ZE*x* is requested and, through the operation of digit receiving means Z*i*, the checking device ZZ identifies the signal as a reconfirmation signal.

Turning first to FIG. 7, the comparison device VA supplies an input to the AND gate Gt1 over the conductor *va*, indicating that the identification of the reconfirming speaking station is found at phase P2 in the storage device U*a*. Since the reconfirmed speaking station N*x* is the one which emitted the second reconfirmation signal, a second input is provided to gate Gt1 from the store RB over conductor *rb*. Since a reconfirmation call is already in operation with the phase P2, a signal is also transmitted to the gate Gt1 by the store RG over conductor *rg'*. As a result, the gate Gt1 furnishes an output to the flip-flop KK1 and simultaneously supplies a pulse to the 100 microsecond delay device RuP.

The flip-flop KK1 is connected through an intermediate set of connections (not shown) to the input of a second flip-flop KK2. The flip-flop KK2 is operated at a predetermined control phase and stores the identification combination picked up in the flip-flop KK1 from the gate Gt1, in the information and operation cycle. In the operation cycle the gate Gt2 is operated at phase P2, so that the identification of the reconfirmed speaking station then at the output of the signal generator with phase P2 is keyed into a special temporary storage device ZS (not shown) through a signal provided over the conductor *zs*. It should also be understood that in a telephone installation with a control apparatus dependent on the signal generator, the cycle of the signal generator is held in such a way that the identifications as the output of the signal generator remain on for another 100 microseconds following the information cycle. That is, the same identification exists during the control cycle as during the information cycle.

Turning now to FIG. 8, an AND gate Gt3 is provided with one input over conductor *va*. This input is available at phase P2 from the comparison device VA, indicating that the identification of speaking station N1 is registered at phase P2 in the storage device U*a*. A second input of the gate Gt3 is supplied over conductor *rb'* from special storage device RB, to indicate that a reconfirmation signal was provided at phase P2 by the reconfirmed station. The last input of gate Gt3 is obtained from conductor *rg'*, indicating that the storage device RG was provided with a pulse which indicates an existing reconfirmation call at phase P2. The gate Gt3 is therefore operated to provide an actuating pulse for flip-flop KK3.

The output of the gate Gt3 is also connected to the input of the circulation storage device or travel time link RuP. This travel time link provides a delay of 100 microseconds and has its output connected to one of the inputs of the AND gate Gt7. As indicated above, this provides for a delay between the information and operation cycles of the control apparatus.

The gate Gt14 is provided with the outputs of the special store RB, over conductor *rb'*, and of comparison device VB over conductor *vb*. Since at phase P2 a pulse is available from each of these devices, the gate Gt14 is operated and supplies an operating pulse for flip-flop KK4.

With both flip-flop KK3 and flip-flop KK4 operated, the AND gate Gt5 supplies an energizing pulse to flip-flop KK5. The flip-flop KK5 operates to store the pulse fed therein for the duration of the information and operation cycles.

One output of the flip-flop KK5 is directed to the OR gate G*t*6. The output of this gate is supplied to the AND gate G*t*7 which also obtains the output of the travel time link R*u*P. As a result, in the operation cycle, the gate G*t*7 supplies an output over its conductor *rl*. This conductor is connected to appropriate devices which supply cancellation pulses at the phase P2 to the storage devices U*a* and U*b*, as well as U*da* and U*db*. The phase P2 is therefore completely released.

An OR gate G*t*9 is actuated at phase P1 by a pulse from the comparison device VA, over conductor *va*, since the identification of transmission device AU*ex* is still circulating at this phase in store U*a*. At the same time the OR gate G*t*10 is operated by an output from the storage device RB over conductor *rb'*. The outputs of the gates G*t*9 and G*t*10 are supplied to an AND gate G*t*11, which also receives the inverted output of the storage device RG, over conductor *rg'*. Since no reconfirmation call exists at phase P1, a pulse exists at each input of gate G*t*11, and a pulse at phase P1 during the information cycle is supplied to the input of the travel time link UR. This link or time delay device functions to provide a delay of 100 microseconds, so that a pulse is then delivered at phase P1 to the input of the AND gate G*t*8. Since the other input to this gate is supplied by flip-flop KK5, which is operated at this time, a signal is available at the output of gate G*t*8. This signal operates over conductor *zsb* to actuate a switch which is similar in function to the switches D1 and D2, but which connects the identification of the reconfirming station N*x* to the circulation storage device U*b*. This identification is received from a temporary storage device.

At the same time over the conductor *rbl* the output command signal from gate G*t*8 functions to cancel the reconfirmation signal circulating with phase P1 in the auxiliary store RB.

At this time the identification of the exchange office line AL*x* is stored with phase P1 in circulation store U*a*, and the identification of the reconfirmed speaking station N*x* is registered with the same phase in store U*b*. The two connection stations are therefore connected to the speaking multiplex line SM at pulse phase P1 through operation of the respective circulation store devices, decoders and switches, and resultant operation of the respective speaking switches.

The shift can also occur in the same fashion in such a way that the temporary storage of the identification of the reconfirmed station is effected through a command pulse which is independent of the cycle of the signal generator. A corresponding control function does not differ substantially from the control described in conjunction with FIG. 8. However, the control of the shift can occur independently of the phase cycle in a way such that the shift occurs through successive switching processes. In each case when a command signal is formed, this command is emitted with the corresponding pulse phase, possibly to pick up new information. Only after completion of all switching processes essential to the shift are the corresponding assigned control devices released.

Any further reconfirmation occurring after the retracing or shifting operation is performed in accordance with the procedure described for the first reconfirmation signal. Any further shift following such further reconfirmation also occurs in accordance with the first shift.

The technique and processes described for a time multiplex arrangement requires no special manner of operation and no special control device or apparatus for each further reconfirmation and each further shift. In each case it is necessary only to assign specified pulse phases to the specified speaking switches. The control for this system is described.

Figure 6:
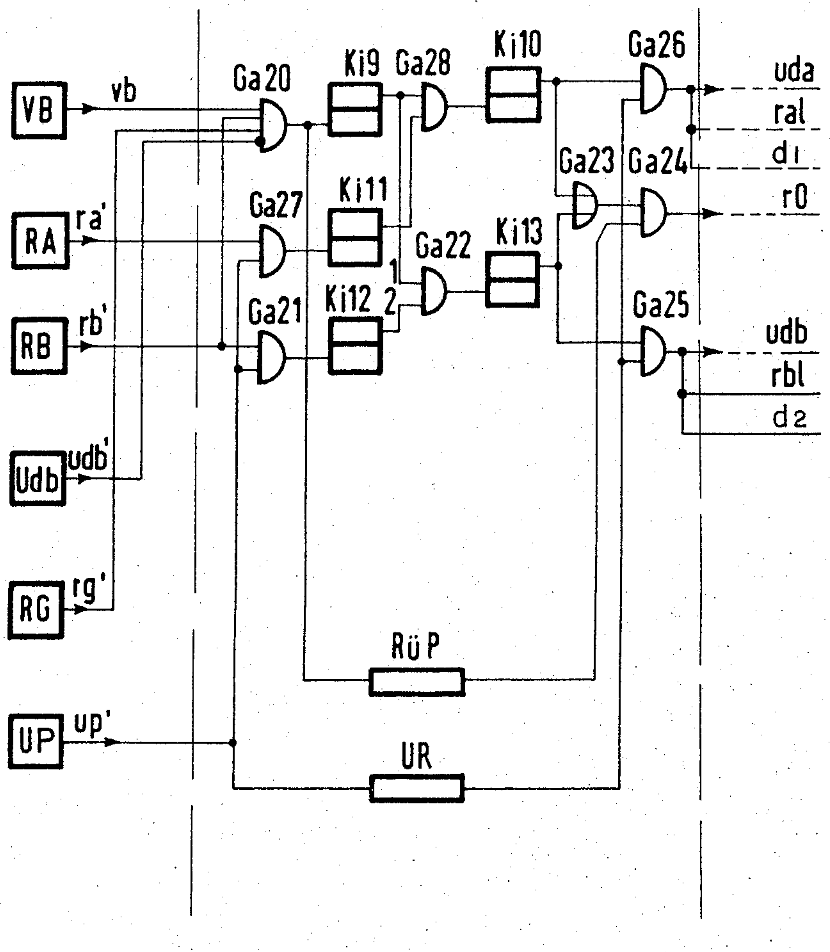

FIGS. 6 and 8 describe the shift of an exchange office connection in which the reconfirmed speaking station is identified in the original phase in a circulation store. This identification is in a manner such that the reconfirmed speaking station is connected to the multiplex point in the original phase. If for example the exchange office line in the original phase is also connected to the speaking multiplex point with the original phase, this waiting connection station may then be connected to the multiplex point in the shift operation.

In contrast to the shift operation described in FIGS. 6 and 8, it is also possible that the waiting station, such as the exchange office line, be identified in a storage device in the phase assigned to the reconfirmation connection, instead of the original phase, and that an impulse also be picked up in an auxiliary storage device with this phase. This can occur by emission of corresponding other control commands. Thus for example, the exchange office line may be connected with the multiplex point in the phase assigned to the reconfirmation connection. The identification of the exchange office line is picked up in the storage device in which the identification of the reconfirming speaking station was stored. Prior to this new storing operation the identification of the reconfirming speaking station is to be cancelled in the corresponding assigned circulation storage device. Thus by this technique, the reconfirmed speaking station and the waiting connection line (such as the exchange office line), can be connected with the multiplex point by control of speaking switches SN*x* and SA*x*, with the reconfirmation phase, through operation of the corresponding switches S*p*1 and S*p*2. This can occur by registration of pulses in the control storage device assigned to the corresponding circulation store, and with the phase assigned to the reconfirmation connection.

The above-described shift to the reconfirmation phase is advantageous as compared with the technique described in FIGS. 6 and 8 in that, for example, in long distance calls, control of the accounting is much simpler for the reconfirmed speaking station which has taken over the exchange office connection and which is to be burdened with the newly arriving charges. The accounting for the original connection, that is the connection between a speaking station and an exchange office line, occurs in the original pulse phase, and after shift of the connection to a reconfirmed speaking station, further accounting is through the reconfirmation phase.

From the above description it will be evident that by separation of the accounting in accordance with the original connection and the new connection a simpler means of distinguishing the charges imposed on the speaking stations in long distance calls is possible.

In accordance with known techniques, by replacement of the receiver performed by the exchange office party during a reconfirmation connection between two stations of the secondary installation, a busy signal can be given to the speaking multiplex point on the original phase, without disturbing the existing reconfirmation call, this original phase being assigned to the original connection and thus also still assigned to the waiting exchange office party. By this the party recognizes without retracing the original connection and without shifting the calling connection to the original phase, by the busy signal in the original phase, and after completon of the reconfirmation call that the exchange office party has replaced the receiver.

If one of the two speaking stations participating in a reconfirmation call replaces the receiver, then by reason of this operation a control signal can be provided to the central control apparatus so that either a call is initiated at the exchange place, or the renewed call to the party that replaced the receiver is effected.

It will be evident that many minor changes could be made in the apparatus specifically described herein as illustrative of the invention. Accordingly, the invention is not to be considered limited to the apparatus specifically described but rather only by the scope of the appended claims.

We claim:

1. In a telephone exchange system operating in accordance with the time multiplex principle and including a first and a second identification circulation storage device each operable periodically to provide at its output coded identifications stored therein, in the pulse phase in which they were recorded; said devices being operable to provide at their respective outputs coded identifications of the calling and the called stations of an original connection, in a first pulse phase. and coded identifications of the calling and the called stations of a second connection, in a second pulse phase, one of said stations of the original connection being the calling station of the second connection; a speaking switch connected between each station and the multiplex path and operable when closed to connect its station to that path; a different decoder connected to each said storage device and to said speaking switches; a different control circulating storage device associated with each of said decoders, each control device being operable to provide at its output periodically a pulse of each phase stored therein, said control devices being operable to permit operation of the associated decoder only when a pulse of the same phase as the identification stored in the associated storage device is provided by the control device; said decoders each being operable to translate the coded identification provided from the respective identification devices into operation of the speaking switch assigned to the identified station when a pulse of the same pulse phase is simultaneously available at the output of the corresponding control device; each of said calling and called stations of each said connection being operable to emit a special signal signifying a desired change in connection; cancellation means associated with each control device operative when supplied with a pulse to cancel the pulse circulating therein of the same pulse phase as the supplied pulse, said cancellation means in the one control device associated with the calling party of said second connection being responsive to emission of a first special signal by the calling party of said second connection to cancel the pulse of said first pulse phase therein; insertion means for each control device operative to insert in that control device a pulse when supplied with a pulse, said inseriton means being operative upon emission of said first special signal to insert in each control device a pulse of said second phase, so that the calling station of said second connection is only connected to the called station thereof in said second pulse phase; the improvement comprising, control means responsive to the pulse phase coincidence of identification of the calling and called stations of said second connection, and of the emission of a second special signal by the calling station of said second connection, said control means upon said coincidence being operative to direct pulses to said identification devices to cancel the identification of the calling and called stations of said second connection in the respective identification devices and to direct a pulse to said one control device in said first pulse phase to reinsert said pulse therein and reestablish said original connection.

2. The apparatus of claim 1 including a busy signal transmitter, a transmitter speaking switch connected between said transmitter and the multiplex path and operable when closed to connect the transmitter to that path, a third control circulating storage device connected to said transmitter switch and operable to close it each time a pulse is delivered at its output, said control device being operable periodically to provide at its output pulses in the same pulse phase originally stored therein.

and additional control means responsive to the pulse phase coincidence of a determination that no free pulse phase exists, of the identification of a previous emission of said special signal, and of a new emission of said special signal, said additional control means upon said coincidence being operable to direct a pulse in said first pulse phase to said third control device for storage therein.

3. The apparatus of claim 1 including signal generator means operable cyclically to provide at its output a coded identification of each station served thereby, and comparison means connected to said signal generator and to said identification devices and operative to supply to said control means indications of identity between the respective inputs from the identification devices and the input from the signal generator.

4. The apparatus of claim 3 including an auxiliary circulation storage device associated with each identification device and each operative to furnish at its output a pulse of the phase of the then-existing connection upon emission of said special signal by the station whose identification is stored in its associated identification device at such phase, said auxiliary devices being connected to said control means to supply their outputs thereto.

5. The apparatus of claim 4 including a further auxiliary storage device operative to furnish at its output a pulse of the phase of said second connection upon completion thereof, said further device being connected to said control means to supply its output thereto.

6. In a telephone exchange system operating in accordance with the time multiplex principle and including a first and a second identification circulation storage device each operable periodically to provide at its output coded identifications stored therein, in the pulse phase in which they were recorded, said devices being operable to provide at their respective outputs coded identifications of the calling and the called stations of an original connection, in a first pulse phase, and coded identifications of the calling and the called stations of a second connection, in a second pulse phase; one of said stations of the original connection being the calling station of the second connection; a speaking switch connected between each station and the multiplex path and operable when closed to connect its station to that path; a different decoder connected to each said storage device and to said speaking switches; a different control circulating storage device associated with each of said decoders, each control device being operable to provide at its output periodically a pulse of each phase stored therein, said control devices being operable to permit operation of the associated decoder only when a pulse of the same phase as the identificaiton stored in the associated storage device is provided by the control device; said decoders each being operable to translate the coded identification provided from the respective identification devices into operation of the speaking switch assigned to the identified station when a pulse of the same pulse phase is simultaneously available at the output of the corresponding control device; each of said calling and called stations of each said connection being operable to emit a special signal signifying a desired change in connection; cancellation means associated with each control device operative when supplied with a pulse to cancel the pulse circulating therein of the same pulse phase as the supplied pulse, said cancellation means in the control device associated with the calling party of said second connection being responsive to emission of a first special signal by the calling party of said second connection to cancel the pulse of said first pulse phase therein; insertion means for each control device operative to insert in that control device a pulse when supplied with a pulse, said insertion means being operative upon emission of said first special signal to insert in each control device a pulse of said second phase, so that the calling station of said second connection is only connected to the called station thereof in said second pulse phase, the improvement comprising, control means responsive to pulse phase coincidence of identification of emission of a second special signal, of identification of an existing said second connection, and of identification of the called party of the second connection as having emitted said second special signal, said control means upon said coincidence being operative to direct a pulse to said one control device to cancel the pulse of said second pulse phase therein to prevent connection of the calling party of said second connection to the multiplex path in said second pulse phase.

7. The apparatus of claim 6 in which said control means is additionally operative upon said coincidence to direct pulses to said identification devices to cancel the identification of the calling and called stations of said second connection at said second pulse phase in the respective identification devices.

8. In a telephone exchange system operating in accordance with the time multiplex principle and including a first and a second identification circulation storage device each operable periodically to provide at its output coded identifications stored therein, in the pulse phase in which they were recorded, said devices being operable to provide at their respective outputs coded identifications of the calling and the called stations of an original connection, in a first pulse phase, and coded identifications of the calling and the called stations of a second connection, in a second pulse phase; one of said stations of the original connection being the calling station of the second connection; a speaking switch connected between each station and the multiplex path and operable when closed to connect its station to that path; a different decoder connected to each of said storage devices and to said speaking switches; a different control circulating storage device associated with each of said decoders, each control device being operable to provide at its output periodically a pulse of each phase stored therein, said control devices being operable to permit operation of the associated decoder only when a pulse of the same phase as the identification stored in the associated storage device is provided by the control device; said decoders each being operable to translate the coded identification provided from the respective identification devices into operation of the speaking switch assigned to the identified station when a pulse of the same pulse phase is simultaneously available at the output of the corresponding control device; each of said calling and called stations of each said connection being operable to emit a special signal signifying a desired change in connection; cancellation means associated with each control device operative when supplied with a pulse to cancel the pulse circulating therein of the same pulse phase as the supplied pulse, said cancellation means in the one control device associated with the calling party of said second connection being responsive to emission of a first special signal by the calling party of said second connection to cancel the pulse of said first pulse phase therein; insertion means for each control device operative to insert in that control device a pulse when supplied with a pulse, said insertion means being operative upon emission of said first special signal to insert in each control device a pulse of said second phase, so that the calling station of said connection is only connected to the called station thereof in said second pulse phase, the improvement comprising, control means responsive to the pulse phase coincidence of the identification of the called station of said second connection, of the identification of said second connection, and of the emission of a second special signal, by said called station of the second connection, said control means upon said coincidence being operative to store said identification of the called station of said second connection in the identification device storing the identification of the calling station of the second connection, in place thereof and in said first pulse phase.

9. The apparatus of claim 8 in which said control means is further operative upon said coincidence to direct pulses to said control devices to cancel the pulses of the second pulse phase therein.

10. In a telephone exchange system operating in accordance with the time multiplex principle and including a first and a second identification circulation storage device each operable periodically to provide at its output coded identifications stored therein, in the pulse phase in which they were recorded; said devices being operable to provide at their respective outputs coded identifications of the calling and the called stations of an original connection, in a first pulse phase, and coded identifications of the calling and the called stations of a second connection, in a second pulse phase, one of said stations of the original connection being the calling station of the second connection; a speaking switch connected between each station and the multiplex path and operable when closed to connect its station to that path; a different decoder connected to each of said storage devices and to said speaking switches; a different control circulating storage device associated with each of said decoders, each control device being operable to provide at its output periodically a pulse of each phase stored therein, said control devices being operable to permit operation of the associated decoder only when a pulse of the same phase as the identification stored in the associated storage device is provided by the control device; said decoders each being operable to translate the coded identification provided from the respective identification devices into operation of the speaking switch assigned to the identified station when a pulse of the same pulse phase is simultaneously available at the output of the corresponding control device; each of said calling and called stations of each said connection being operable to emit a special signal signifying a desired change in connection; cancellation means associated with each control device operative when supplied with a pulse to cancel the pulse circulating therein of the same pulse phase as the supplied pulse, said cancellation means in the one control device associated with the calling party of said second connection being responsive to emission of a first special signal by the calling party of said second connection to cancel the pulse of said first pulse phase therein; insertion means for each control device operative to insert in that control device a pulse when supplied with a pulse, said insertion means being operative upon emission of said first special signal to insert in each control device a pulse of said second phase, so that the calling station of said second connection is only connected to the called station thereof in said second pulse phase; the improvement comprising, signal generator means operative cyclically to provide at its output a coded identification of each station served thereby, including the called station of said second connection, a temporary store operative to be connected to said signal generator means to receive therefrom a coded identification of a station when an enabling pulse is received, and control means responsive to pulse phase coincidence of identification of the called station of said second connection at said signal generator output, of emission of the second special signal, by said called station, and of identification of said second connection, said control means upon said coincidence being operative to direct an enabling pulse to said temporary store to provide for storage therein of the identification of said called station of said second connection.

11. The apparatus of claim 10 including first and second switching means for transferring the coded identification of said called station in said temporary store respectively to one and the other said identification devices when supplied with an actuating pulse, said control means being further responsive to coincidence with the previously-recited signals of identification, of the identification of the calling station of said second connection in the respective one and the other said identification devices, at said first phase, to supply an actuating pulse to the respective second and first said switching means at said first pulse phase.

References Cited

UNITED STATES PATENTS

| | | | |
|---|---|---|---|
| 2,766,327 | 10/1956 | Lesti | 179—18.9 |
| 2,984,705 | 5/1961 | Harris | 179—15 |
| 3,271,521 | 9/1966 | Von Sanden et al. | 179—15 |
| 3,296,377 | 1/1967 | Von Sanden et al. | 179—15 |

KATHLEEN H. CLAFFY, *Primary Examiner.*

L. A. WRIGHT, *Assistant Examiner.*